United States Patent
Vieillot

(12) 
(10) Patent No.: US 6,592,079 B2
(45) Date of Patent: Jul. 15, 2003

(54) PASSIVE COOLER COMPRISING DUAL ELLIPTICALLY-BASED CONES

(75) Inventor: Jacques Vieillot, Cannes la Bocca (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/977,307

(22) Filed: Oct. 16, 2001

(65) Prior Publication Data

US 2002/0050340 A1 May 2, 2002

(30) Foreign Application Priority Data

Oct. 31, 2000 (FR) .............................. 00 13999

(51) Int. Cl.[7] ................................. B64G 1/54
(52) U.S. Cl. .................. 244/163; 244/158 R; 165/41; 165/135
(58) Field of Search ................. 244/158 R, 163, 244/158 A, 121; 250/515.1; 165/147, 41, 135, 904; 237/79

(56) References Cited

U.S. PATENT DOCUMENTS

| | | |
|---|---|---|
| 3,310,102 A | 3/1967 | Trombe |
| 3,516,623 A * | 6/1970 | Sinden ....................... 244/169 |
| 3,899,674 A | 8/1975 | Decramer et al. |
| 4,294,199 A * | 10/1981 | Darling et al. .............. 122/248 |
| 4,669,685 A * | 6/1987 | Dalby ............................ 165/6 |
| 5,601,258 A * | 2/1997 | McClymonds .......... 244/158 R |
| 6,189,835 B1 * | 2/2001 | Kaufman ................ 244/158 R |

FOREIGN PATENT DOCUMENTS

| | | | |
|---|---|---|---|
| FR | 2 682 931 | | 4/1993 |
| JP | 3571922798 A | * | 5/1981 ................. 165/147 |

OTHER PUBLICATIONS

Petersen et al., May 1997, Passive Cryogenic Cooler for MSG Severi Design and Performance.*

Petersen H et al.: "Passive Cryogenic Cooler for MSG Seviri Design and Performance" European Symposium on Space Environmental Control Systems, XX, XX; vol. 2, May 20, 1997, pp. 523–531.

* cited by examiner

*Primary Examiner*—Charles T. Jordan
*Assistant Examiner*—Timothy D. Collins
(74) *Attorney, Agent, or Firm*—Sughrue Mion, PLLC

(57) ABSTRACT

The invention provides a passive cooler for a detector on board a satellite; the cooler comprises a sunshade, a sunshade radiator forming the end of the sunshade, an infrared deflector at the end of the sunshade, and a radiator forming the end of the deflector. According to the invention, the sunshade has an elliptical base and forms a constant angle relative to the axis of the cooler. The deflector also presents a base that is elliptical. The invention makes it possible to improve the thermal performance of the cooler by making use of all of the volume available for the cooler.

23 Claims, 3 Drawing Sheets

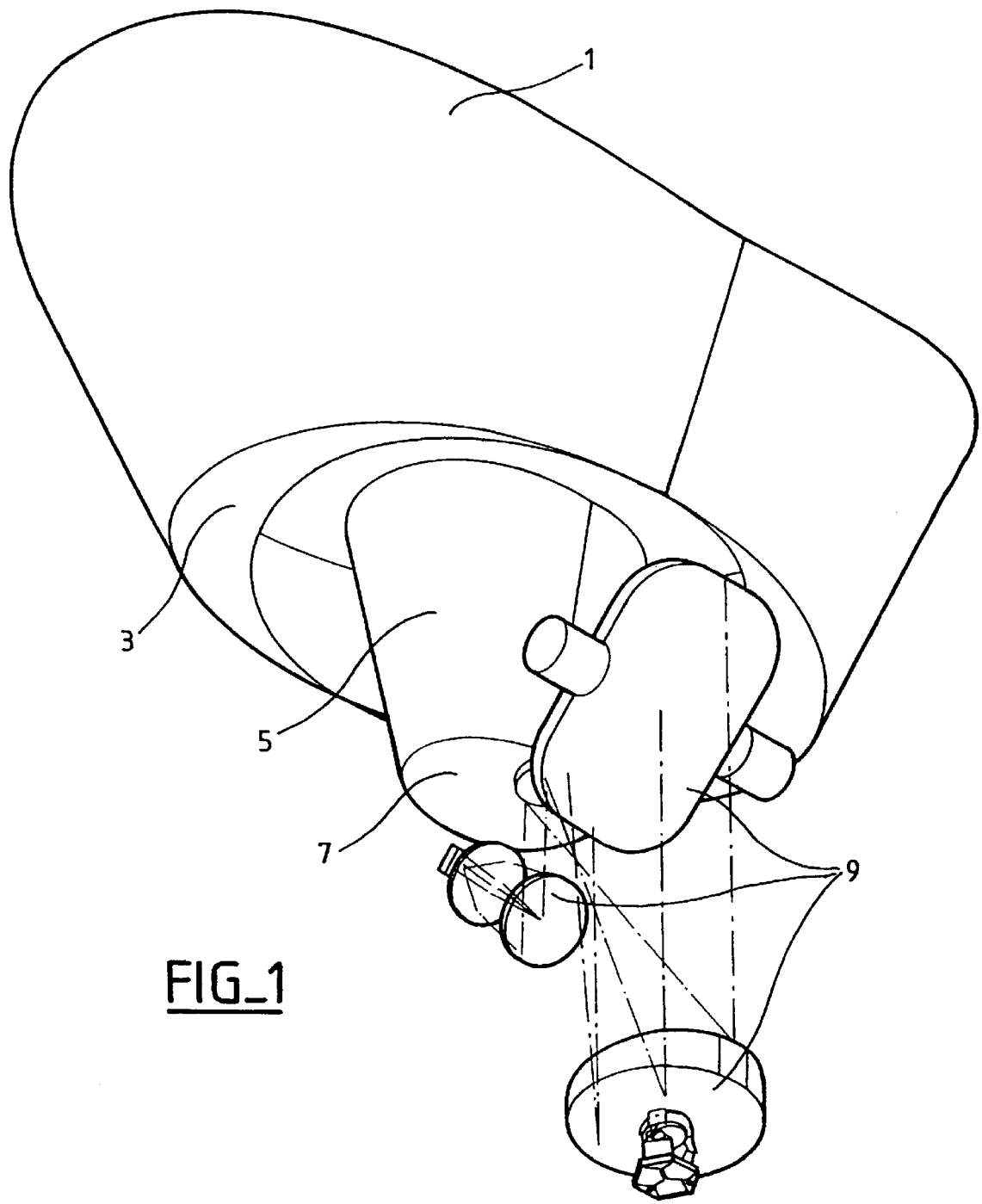
FIG_1

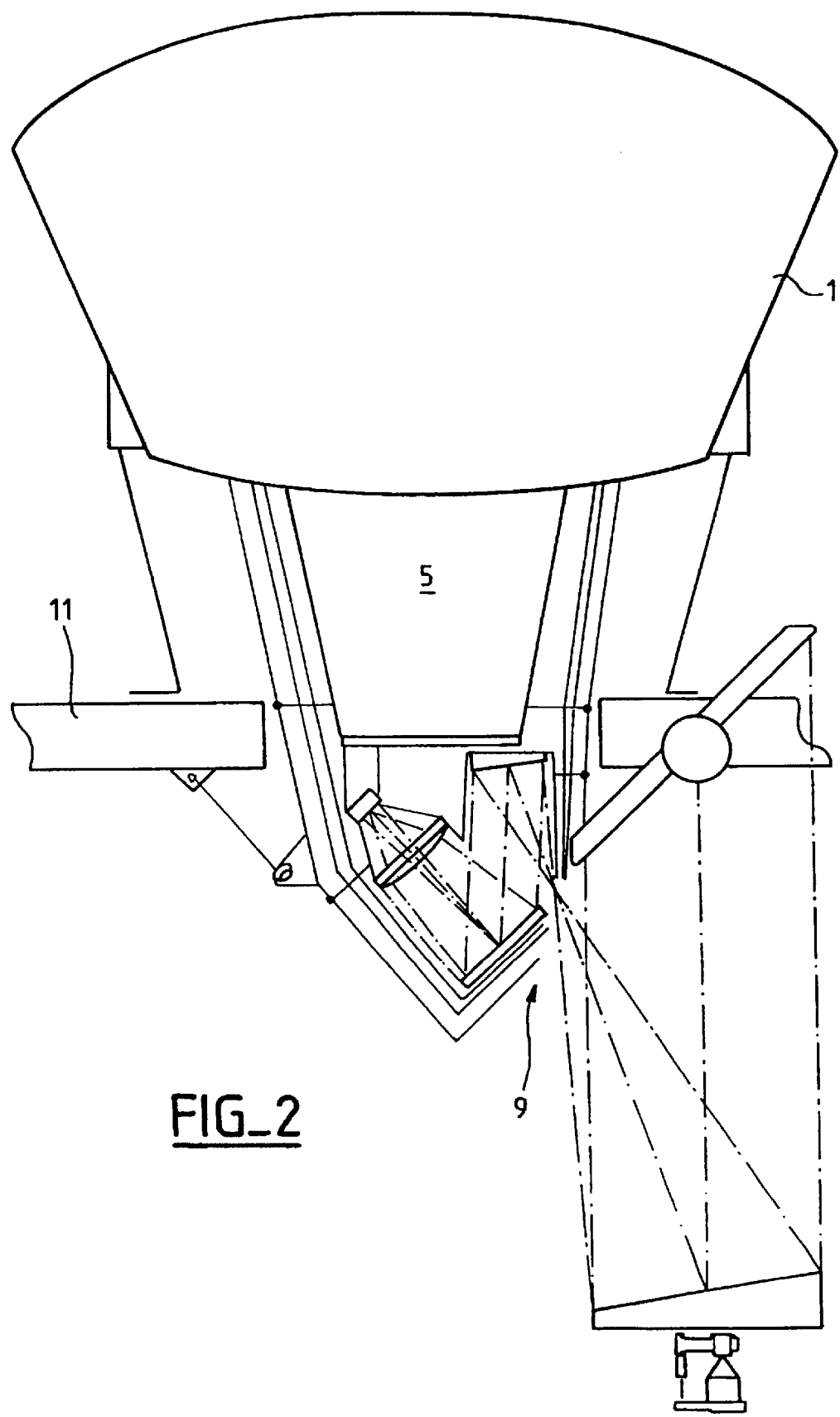
FIG_2

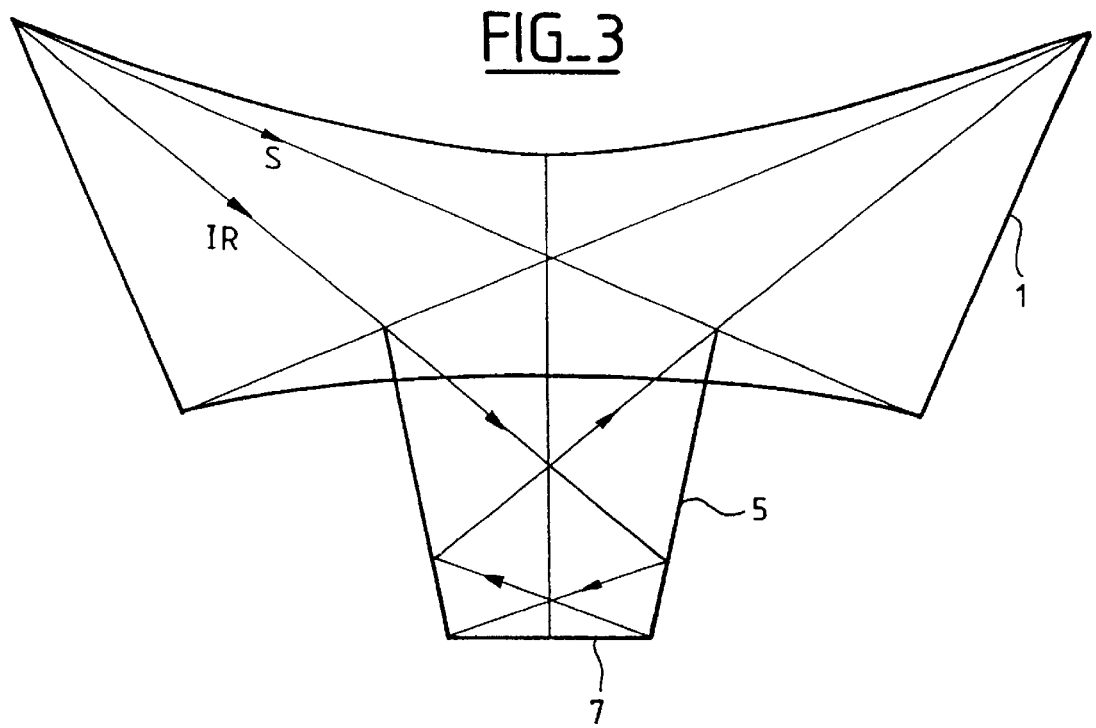
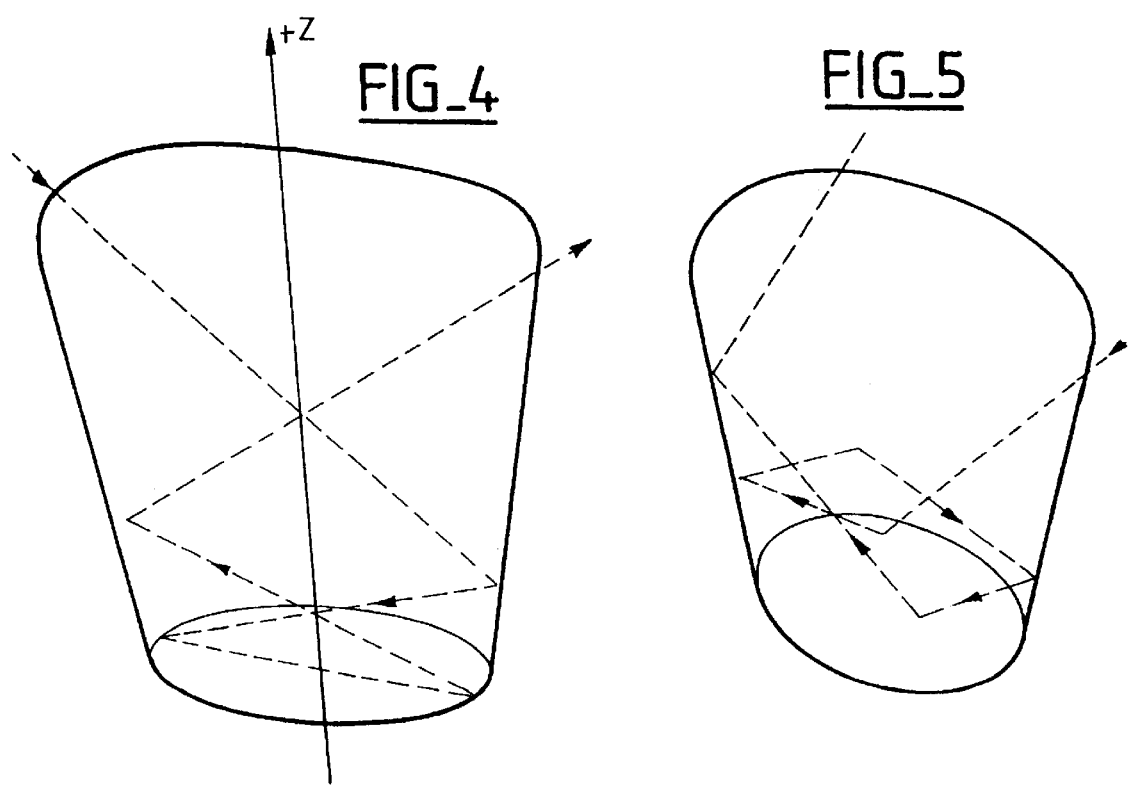

PASSIVE COOLER COMPRISING DUAL ELLIPTICALLY-BASED CONES

The invention relates to the field of satellites, and more specifically to coolers used in geostationary spin-stabilized satellites. The term "spin-stabilized" is used herein to designate satellites that rotate about their own axis in addition to any movement on their orbit.

BACKGROUND OF THE INVENTION

Equipment on board a satellite, such as a radiation detector, needs to be protected both against solar radiation and against infrared radiation coming from high temperature surfaces, typically at 300 kelvins (K). Proposals have been made to use active coolers; nevertheless such designs require electricity. They are also poorly adapted to spin-stabilized satellites because of feasibility constraints for the mechanical environment generated by the satellite spinning. It is commonplace to find dynamic acceleration levels on spin-stabilized satellites lying in the range about 10 g to 15 g, i.e. 98.1 meters per second per second ($ms^{-2}$) to 147.15 $ms^{-2}$. Finally, the reliability of such active coolers is limited and can be improved only by providing redundant thermal equipment; such a solution leads to greater mass.

Proposals have therefore been made to use passive coolers. U.S. Pat. No. 4,820,923 describes a passive cooler for a cryogenically-cooled radiation detector which has a toroidal reflective surface. More precisely, the detector is disposed at the end of a tube whose walls are provided with toroidal reflector segments; GB-A-2 115 143 proposes a detector of the same type. U.S. Pat. No. 4,775,792 describes another form of reflector, adapted to protecting a strip of infrared detectors. U.S. Pat. No. 4,150,552 describes an assembly comprising a condenser and a radiation well placed in the vicinity of the detector that is to be cooled; that document mentions various surface treatments for the materials. U.S. Pat. No. 4,121,434 proposes a device for protecting a high resolution radiometer. The device comprises a first conical stage with a shield mounted on a hinge, and a second cylindrical stage located at the end of the cone. U.S. Pat. No. 4,030,316 describes a passive cooler having three stages for cooling an infrared detector. The first stage is frustoconical and reflects solar energy in a single reflection. The second stage is also frustoconical and lies inside the first stage. The third stage is cylindrical and is placed at the end of the second stage. U.S. Pat. No. 3,422,886 also shows a passive cooler with an example that includes a structure made up of a plurality of cones nested in one another. JP-A-4 323 525 describes a cooler formed by a Dewar flask in contact with a supply of coolant. The flask contains a mirror in the form of an ellipsoid of revolution. The device as a whole presents circular symmetry.

A cooler comprising two circular cones was used for the first generation of MeteoSat satellites (MOP). The cooler comprises a sunshade whose function is to protect the cold stages of the cooler from sunlight that is direct or indirect (by reflection on the sunshade); the sunshade is frustoconical in shape with a plane radiator in the end of the truncated cone. The cooler also comprises a conical infrared deflector which is placed at the end of the sunshade in the middle of the radiator thereof. The function of that reflector is to protect the radiator of the detector stage from any direct infrared radiation coming from the sunshade: nearly all of the infrared radiation coming from the sunshade is reflected on the walls of the deflector and is returned outwards after one or more reflections. Finally, the cooler includes a radiator installed at the base of the deflector; the detectors are placed on the rear face of the radiator.

For the cooler of the Seviri instrument of the second generation of MeteoSat satellites, Matra Marconi Space has used a cooler of the same kind, but in which the infrared deflector is in the form of an ellipsoid of revolution having a circular base. The radiator as a whole is still circularly symmetrical. Compared with a dual cone cooler, that solution makes it possible to increase the dimensions of the radiator installed at the base of the defector to a small extent, other things being equal.

A cooler comprising a single circular cone was proposed to the European Space Agency (ETA) by Matra Marconi Space in the context of phase A of the second generation MeteoSat project. That device uses a sunshade as the dual cone cooler; it also comprises two plane radiators disposed at the base of the sunshade. The problem with such a device is that the radiator is not protected from infrared radiation coming from the sunshade. This gives rise to a significant increase in the thermal load on the radiator, thereby reducing the temperature performance of the detector stage.

OBJECTS AND SUMMARY OF THE INVENTION

The invention relates to the problem of performance in passive coolers; in addition, as with all equipment mounted on a satellite, there is also the problem of equipment mass and bulk.

The invention proposes a novel passive cooler which presents improved thermal performance and which makes better use of the space available.

More precisely, the invention provides a passive cooler for a satellite, the cooler comprising a sunshade and a radiator forming the end of the sunshade; the sunshade has an elliptical base and a surface that forms a constant angle relative to the axis of the cooler.

Preferably, the cooler further comprises an infrared deflector at the end of the sunshade together with a radiator forming the end of the deflector. The deflector can also have an elliptical base.

In either case, the ratio of the major axis over the minor axis of the elliptical base is advantageously greater than or equal to 1.1, or even greater than 1.3.

It is possible to provide radiators on the outside face of the sunshade.

In an embodiment, an incident ray in the vicinity of the edge of the sunshade traveling towards the end of the sunshade at the other side thereof, does not penetrate into the deflector.

It is also advantageous for an infrared ray emitted by the sunshade and penetrating into the deflector to leave the deflector after being reflected at least once on the wall of the deflector.

In an embodiment, the angle between the axis of the cooler and the wall of the sunshade is greater than 23.5°; the angle between the axis of the cooler and the wall of the deflector is close to 10°.

The invention also provides a satellite including such a cooler; the satellite can be geostationary and spin on its own axis.

BRIEF DESCRIPTION OF THE DRAWINGS

Other characteristics and advantages of the invention will appear on reading the following description of an embodiment of the invention given as an example and with reference to the accompanying drawings, in which:

FIG. 1 is a diagrammatic perspective view of a cooler of the invention;

FIG. 2 is a side view of the FIG. 1 cooler;

FIG. 3 is a diagrammatic section of the FIG. 1 cooler;

FIG. 4 is a diagram showing the path followed by a ray intersecting the axis in a cone having an elliptical base; and FIG. 5 is a diagram showing the path followed by a ray that does not intersect the axis in a cone having an elliptical base.

MORE DETAILED DESCRIPTION

In a dual cone passive cooler, the invention proposes making use not of circular section cones, but of surfaces that present an elliptical base; this solution makes better use of the volume available for the cooler and increases the area for the detector stage radiator, thereby improving thermal performance.

FIG. 1 is a diagrammatic perspective view of a cooler of the invention; in the figure there can be seen a sunshade 1. As with a conventional dual cone cooler, its function is to protect the cold stages of the cooler, i.e. the infrared reflector and its radiator, from solar radiation penetrating directly into the cooler or reflected by the sunshade.

As shown in the figure, the invention proposes a sunshade which presents an elliptical base and a surface that forms an angle which is constant with the axis of the reflector. In other words, the sunshade can be generated by moving a straight line around an ellipse, the line being perpendicular to the tangent of the ellipse and forming a constant angle with the plane of the ellipse. Alternatively, with the axis of the cooler perpendicular to the plane of the ellipse, the angle between the axis of the cooler and the surface is constant. It will be understood that the sunshade thus presents a surface which can be developed, thereby making it easier to manufacture. The way rays are reflected by the sunshade is explained with reference to FIGS. 4 and 5.

A radiator 3 is provided at the end of the sunshade. This radiator is elliptical in shape and defines the base of the sunshade. It contributes to reflecting the sun's radiation and it is conductively coupled to the sunshade and/or to the load-carrying structure of the cooler.

On the axis of the sunshade, close to the center of the sunshade, there is provided an infrared deflector 5. The main function of this deflector is to protect the radiator of the bottom stage from any direct infrared radiation coming from the sunshade. This deflector also presents a base that is elliptical; unlike the sunshade, its surface is not necessarily at an angle that is constant with the axis of the cooler. Like the sunshade 1, it rejects most of the infrared radiation coming from the sunshade to the outside after successive reflections on its inside wall, as can be seen in FIGS. 4 and 5.

A radiator 7 is located at the end of the deflector 5, and it supports detectors 9 on its rear face, i.e. on its face outside the deflector. The detectors are shown diagrammatically in the figure and are not described in greater detail. The various devices which may be installed in the vicinity of the detectors, such as heaters and temperature sensors, are not described in greater detail either; these devices can be used to regulate the detector stage on the required temperature in cold environment conditions, for example in the absence of any solar flux on the sunshade, in the event of minimum temperatures at the interfaces with the satellite and the hot portion of the probe. It will be observed that these devices do not change the nature of the cooler which remains a passive cooler.

The invention presents the following advantages compared with a cooler comprising two circularly-based cones. Given its simplicity and its robustness, the cooler of the invention, like a prior art cooler, can be installed on a spin-stabilized satellite; however, unlike a prior art cooler, it can be installed in a volume which is not in the form of a tube or on a square base; thus, the cooler of the invention can provide better occupation of the available space. By way of comparison, the dimensions of the circular-base cooler are limited by the space availability constraints along the X axis, i.e. along an axis contained in the plane of the radiator of the deflector; it can thus happen that the cooler is smaller, in the plane of the radiator, than the space available. The invention is based on perceiving this novel problem, and it provides a solution which enables the cooler to use the available volume to the full. In a given volume, the cooler of the invention presents a dimension along the minor axis of the ellipse which corresponds to the diameter of the prior art cooler; it will thus be understood that the volume to the cooler of the invention is larger, in proportion to the ratio between the surface of the ellipse and the surface of a circle inscribed within the ellipse. In one example of available-space constraints, the Applicant has found that the surface area of a radiator in a cooler of the invention can be increased by about 40% compared with the surface area of the radiator in a prior art cooler. This provides a corresponding improvement in thermal terms: the rejection power of the radiator increases. In addition, the cooler of the invention is better adapted to the instrument being installed peripherally, outside the central tube of the satellite.

FIG. 2 is a side view of a cooler of the invention. There can be seen the sunshade 1, the deflector 5, and the detectors 9. FIG. 2 also shows the wall 11 of the central tube of the satellite. As explained below, it can be seen that the sunshade is not fixed directly to the wall of the satellite in the example of FIG. 2. The figure shows the suspension means that connect the various elements of the cooler together mechanically in diagrammatic form only, since, in themselves, these means are known to the person skilled in the art; these suspension means preferably provide good conductive decoupling between the sunshade and the deflector and between the deflector and the detectors. These suspension means are preferably made of materials having low thermal conductivity with coatings having low emissivity.

FIG. 3 is a diagrammatic section view of the FIG. 1 cooler. There can be seen the sunshade 1 and the deflector 5. The geometrical construction of the cooler of the invention can be carried out as shown in FIG. 3. More specifically, the position of the deflector in the sunshade is selected in such a manner that an incident ray inside the sunshade, grazing the outside edge of the sunshade, will reach the end of the sunshade without penetrating into the deflector, and will thus be reflected directly by the sunshade. Such a ray is shown in FIG. 3 and it is given the reference S. This provides optimum performance for the sunshade: incident rays which do not penetrate directly into the deflector are reflected by the sunshade.

The shape of the infrared deflector is selected in such a manner as to reflect infrared rays coming from the sunshade. Under reference IR, the figure shows an infrared ray at maximum incidence: the ray comes from the outside edge of the sunshade and passes through the axis of the cooler so as to be incident on the outside edge of the deflector. The term "axis of the cooler" is used to mean a straight line perpendicular to the plane of the radiator 7 installed at the end of the infrared deflector, and located at the intersection between the major and minor axes of the ellipse constituting the base of the radiator. The shape of the reflector is selected in such a manner that the ray is reflected a first time on the wall of the deflector, a second time close to the bottom edge of the deflector, travels parallel to the radiator, and then leaves after being reflected close to the bottom edge of the deflector and then a fourth time on the wall of the deflector. FIG. 4 is a view on a larger scale showing the path followed by this particular ray. A four-reflection path within the deflector optimizes the area of the radiator; in other words, if a larger number of reflections is used for rays that intersect the axis in the manner shown in FIG. 4, then the surface area of the radiator of the deflector diminishes.

This optimal number of reflections depends on constraints concerning the major and minor axes, and also concerning height. For given constraints, the shape of the deflector is computed so as to maximize the area of the radiator 7. The number of reflections can vary. More precisely, as mentioned above, the angle between the surface of the deflector and the axis of the cooler is not necessarily constant; since the deflector is a component that is smaller in size than the sunshade, it is possible for it to have a warped shape that is more difficult to make than the sunshade; this can make it possible to increase performance in terms of gain at the radiator 7. The exact shape of the deflector can be computed by optimization, seeking to maximize the surface area of the radiator 7. With four reflections, optimization leads to a surface whose angle relative to the axis of the cooler is close to 10°, and more precisely an angle that lies in the range 9.5° to 11.1°; for three reflections, the resulting angle is close to 15°.

FIG. 5 shows the path followed by an arbitrary infrared ray. This ray is reflected six times, without touching the radiator.

It will thus be understood that the outside dimensions of the sunshade are determined by space-availability constraints on board the satellite, and in particular by the position of the radiator of the detector stage, the total height allocated to the cooler, and the dimensions available in the plane of the radiators; the angles of the sunshade and of the deflector are then deduced by ray analysis, as shown diagrammatically in FIGS. 3 to 5; the number of reflections that can be accepted for an incident ray determines the shape of the reflector and of the sunshade.

The angle between the surface of the sunshade and the axis of the cooler depends on the maximum angle of incidence of the sun on the cooler. It is preferably greater than the maximum angle of incident of the sun, while remaining as close as possible thereto. The difference between the maximum angle of incidence and the angle between the surface of the sunshade and the axis of the cooler depends on manufacturing tolerances and also on attitude control tolerances for the satellite. In practice, for a maximum angle of incidence of the sun of 23.5°, it is possible to provide an angle between the surface of the sunshade and the axis of the cooler that is less than 25° or 26°.

In all embodiments of the invention, the term "ellipse" is used not only to cover a true ellipse in the mathematical meaning of the term, but also mathematical curves that approximate thereto, such as curves obtained by deforming a circle centered on the origin by means of a transformation whereby any point of coordinates (x,y) is associated with a point of coordinates (ax,y) where a is a real number other than 1. In all cases, a major axis and a minor axis can be defined which are respective straight lines passing through opposite points on the curve which are furthest apart and which are closest together. It will be understood that the advantages of the invention can also be obtained with curves that are not truly elliptical but which provide the same ray-reflecting properties.

The ratio of the major axis over the minor axis is preferably greater than 1.1, or indeed greater than 1.3. This ratio ensures that good use is made of the space available.

Various preferred optional characteristics of the cooler are specified below. As mentioned above, the angle between the sunshade and the axis of the cooler is greater than 23.5°. The inside face of the sunshade has an inside coating with a high degree of specularity; this ensures that the sun's rays are reflected well. To minimize infrared radiation towards the infrared deflector, it is also advantageous to use a coating having low absorptivity on the bottom face of the sunshade. In particular, the bottom face of the sunshade can have a vacuum deposited aluminum (VDA) coating which presents a high degree of specularity, low emissivity, and low absorptivity.

It is also possible to connect the sunshade via its outside face to external radiator elements in order to decrease its temperature. This is particularly appropriate for the top of the sunshade, i.e. the portion of the sunshade which is furthest from the radiator. It is also possible to provide radiant decoupling between the rear face of the assembly constituted by the sunshade and its radiators from the environment inside the satellite and the cooler; this has the effect of further reducing the radiation emitted by the sunshade. Finally, it is advantageous to provide conductive decoupling between the sunshade and any radiator elements it might have from the supporting structure; this prevents any heating of the sunshade by thermal conductivity.

As shown diagrammatically in FIG. 2, the sunshade is fixed to the structure of the probe. It is also possible to fix the sunshade directly to the structure of the satellite 11. Under all circumstances, conductive decoupling is provided between the sunshade and the structure carrying it. The configuration shown in FIG. 2 has the effect of reducing margins on the dimensions of the elements of the cooler, which are associated with manufacturing tolerances; this optimizes performance of the cooler.

For the radiator 3 at the end of the sunshade, it is possible to use blank paint or white paint or indeed optical solar reflectors (OSRs). The latter type of coating ensures that the radiator has high emissivity and low solar absorptivity.

The infrared deflector can be provided with the same internal coating as the sunshade, and for the same reason. On the rear face of the sunshade or of the deflector, it is possible to provide insulating coatings such as multilayer insulation or coatings having low emissivity. It is also possible to provide radiators.

The screens inside the cooler can be coated in a material having a high degree of specularity, associated with low emissivity, such as vacuum deposited gold (VDG). When the cooler is used for a spectrometer, it should nevertheless be observed that the faces that are directly in view of the spectrometer are advantageously painted black for optical reasons.

The invention also provides a satellite presenting such a passive cooler. By way of example, the satellite can be a spin-stabilized geostationary satellite. Under such circumstances, the cooler can be installed on a north or a south face of the satellite in order to benefit from optimum conditions of solar incidence, and avoid any direct exposure of the radiator of the detectors to sunlight through the infrared deflector. For a cooler of this type, the invention makes it possible to obtain rejection powers of the following orders:

95 milliwatts (mW) for the detectors operating at a temperature of 90 K;

145 mW for a detector operating temperature of 100 K; and 210 mW for a detector operating temperature of 110 K.

More generally, the cooler is suitable for any satellite having low solar incidence with the sun rotating around the axis of the cooler when installed on the satellite.

Naturally, the present invention is not limited to the embodiments and implementations described and shown, and numerous variants can be applied thereto by the person skilled in the art. Thus, it is possible to use an elliptical base surface as proposed by the invention in a single cone passive cooler; when the cooler is a dual cone cooler, better occupation of the volume made available to the cooler is achieved, as well as better thermal efficiency. It is also possible to use a cooler with an elliptical sunshade in the prior art device which presents a deflector of ellipsoidal shape.

What is claimed is:

1. A passive cooler for a satellite, the cooler comprising a sunshade having a surface formed about an axis of the cooler; a radiator disposed at a base of the sunshade, wherein the base of the sunshade is elliptical; an infrared deflector extending from the base of the sunshade in a direction away from the sunshade; and a second radiator closing off an end of the infrared deflector furthest away from the sunshade.

2. The cooler of claim 1, wherein the infrared deflector has an elliptical base.

3. The cooler of claim 1, wherein the ratio of the major axis over the minor axis of the elliptical base of the sunshade is greater than or equal to 1.1.

4. The cooler of claim 1, wherein the sunshade has radiators on its outside face.

5. The cooler of claim 1, wherein an incident ray close to an edge of the sunshade and directed towards the end of the sunshade on the other side thereof does not penetrate into the deflector.

6. The cooler of claim 1, wherein an infrared ray emitted by the sunshade and penetrating into the deflector leaves the deflector after being reflected at least once on a wall of the deflector.

7. The cooler of claim 1, wherein the angle between the axis of the cooler and a wall of the sunshade containing the surface is greater than 23.5°.

8. The cooler of claim 1, wherein the angle between the axis of the cooler and a wall of the deflector is close to 10°.

9. A satellite including a cooler according to claim 1.

10. The satellite of claim 9, said satellite being geostationary.

11. The satellite of claim 9, wherein the satellite spins about its own axis.

12. The cooler of claim 1, wherein the ratio of the major axis over the minor axis of the elliptical base of the sunshade is greater than 1.3.

13. The cooler of claim 1, wherein the radiator is substantially centered about the axis of the cooler.

14. The cooler of claim 1, wherein the radiator has an elliptical shape corresponding to the elliptical base of the sunshade.

15. The cooler of claim 1, wherein the infrared deflector is formed about the axis of the cooler, and the second radiator lays in a plane orientated substantially perpendicular to the axis of the cooler.

16. The cooler of claim 1, wherein the radiator extends inwardly towards the axis of the cooler.

17. The cooler of claim 1, wherein the surface of the sunshade forms a constant angle relative to the axis of the cooler.

18. A satellite, comprising:

a satellite body comprising electronic equipment; and a passive cooler for the satellite, the cooler comprising a sunshade having a surface formed about an axis of the cooler, and a radiator disposed at a base of the sunshade, wherein the base of the sunshade is elliptical.

19. The satellite according to claim 18, further comprising an infrared deflector extending from the base of the sunshade in a direction away from the sunshade; and a second radiator closing off an end of the infrared deflector furthest away from the sunshade, and wherein the infrared deflector is formed about the axis of the cooler, and the second radiator lays in a plane orientated substantially perpendicular to the axis of the cooler.

20. The satellite according to claim 18, wherein the radiator extends inwardly towards the axis of the cooler.

21. The satellite according to claim 18, wherein the surface of the sunshade forms a constant angle relative to the axis of the cooler.

22. The satellite according to claim 18, further comprising an infrared deflector extending from the base of the sunshade in a direction away from the sunshade; and a second radiator at an end of the infrared deflector furthest away from the sunshade.

23. The satellite according to claim 22, wherein the infrared deflector is formed about the axis of the cooler, and the second radiator lays in a plane orientated substantially perpendicular to the axis of the cooler.

* * * * *